US009585439B2

(12) United States Patent
Casebolt

(10) Patent No.: US 9,585,439 B2
(45) Date of Patent: *Mar. 7, 2017

(54) CONNECTOR

(71) Applicant: D B Industries, LLC, Red Wing, MN (US)

(72) Inventor: Scott C. Casebolt, St. Paul Park, MN (US)

(73) Assignee: D B Industries, LLC, Red Wing, MN (US)

( * ) Notice: Subject to any disclaimer, the term of this patent is extended or adjusted under 35 U.S.C. 154(b) by 70 days.

This patent is subject to a terminal disclaimer.

(21) Appl. No.: 14/585,593

(22) Filed: Dec. 30, 2014

(65) Prior Publication Data

US 2015/0107059 A1    Apr. 23, 2015

Related U.S. Application Data

(63) Continuation of application No. 13/660,532, filed on Oct. 25, 2012, now Pat. No. 8,938,864.

(Continued)

(51) Int. Cl.
*F16B 45/04*    (2006.01)
*A44B 11/04*    (2006.01)
(Continued)

(52) U.S. Cl.
CPC .......... *A44B 11/04* (2013.01); *A44B 11/2596* (2013.01); *A62B 35/0037* (2013.01);
(Continued)

(58) Field of Classification Search
CPC ............. A44B 11/2596; A44B 11/2511; A44B 11/2592; F16B 45/04; F16B 21/16;
(Continued)

(56) References Cited

U.S. PATENT DOCUMENTS 128,087 A    6/1872 Wright
923,767 A    6/1909 Buckius
(Continued)

FOREIGN PATENT DOCUMENTS

CN    101392787 A    3/2009
CN    101417164 A    4/2009
(Continued)

OTHER PUBLICATIONS

Reliance Connector 400765, "SkylockTM SRL's—Proven Performance, Built to Last", 1 page (Known of prior to filing present application).

(Continued)

*Primary Examiner* — Jack W Lavinder
(74) *Attorney, Agent, or Firm* — Dicke, Billig & Czaja, PLLC

(57) ABSTRACT

A connector comprises a base, a gate, and a locking mechanism. The base forms an opening. The gate is slidably operatively connected to the base and spans the opening. The locking member has an engaging position and a releasing position. The engaging position secures the gate to the base, and the releasing position allows the gate to be moved relative to the base.

13 Claims, 14 Drawing Sheets

Related U.S. Application Data

(60) Provisional application No. 61/552,551, filed on Oct. 28, 2011.

(51) Int. Cl.
*A62B 35/00* (2006.01)
*A44B 11/25* (2006.01)

(52) U.S. Cl.
CPC ............ *F16B 45/04* (2013.01); *Y10T 24/4002* (2015.01); *Y10T 24/44573* (2015.01); *Y10T 24/44615* (2015.01); *Y10T 24/4501* (2015.01); *Y10T 403/598* (2015.01)

(58) Field of Classification Search
CPC ........ F16B 21/165; F16B 21/10; F16G 15/06; F16D 1/116; Y10T 403/598
USPC ............ 24/573.11, 600.5, DIG. 52, DIG. 51; 294/82.34, 82.35, 82.11, 82.1; 403/155, 403/157, 324
See application file for complete search history.

(56) References Cited

U.S. PATENT DOCUMENTS

| | | | |
|---|---|---|---|
| 3,240,519 A | | 3/1966 | Weasler |
| 4,645,368 A | * | 2/1987 | Simpson ................. F16D 1/116 403/324 |
| 5,193,419 A | | 3/1993 | Lee |
| 6,073,724 A | | 6/2000 | Wolner et al. |
| 8,104,988 B2 | * | 1/2012 | Lunn ...................... F16G 15/06 403/154 |
| 8,276,712 B2 | | 10/2012 | Smith et al. |
| 2007/0151805 A1 | | 7/2007 | Betcher et al. |
| 2009/0211849 A1 | | 8/2009 | Smith et al. |
| 2009/0269133 A1 | * | 10/2009 | Van Amelsfoort ... E02F 3/3604 403/408.1 |
| 2010/0050402 A1 | | 3/2010 | Rissman |
| 2013/0025968 A1 | | 1/2013 | Smith et al. |
| 2013/0104351 A1 | | 5/2013 | Casebolt |
| 2013/0104374 A1 | | 5/2013 | Schlangen et al. |

FOREIGN PATENT DOCUMENTS

| | | |
|---|---|---|
| EP | 2243972 | 10/2010 |
| JP | 5410139 U | 1/1979 |
| JP | 5723779 U | 2/1982 |
| JP | 58196453 U | 12/1983 |
| JP | 2003254393 A | 9/2003 |
| WO | 00/24304 | 5/2000 |
| WO | 2009/108648 A2 | 9/2009 |

OTHER PUBLICATIONS

Reliance Connector 4007-65, Reliance Industries—Product Details, 1 page (Printed Jan. 23, 2013. Known of prior to filing present application).

Reliance Fall Protection—Instructions for Use, 4XXX Series SkylocTM Self Retracting Lifelines, 28 pages, Copyright 2011 Reliance Fall Protection, 4006-62 Rev B, Reliance Fall Protection, Reliance Industries, Deer Park, Texas.

Photographs of Connector 4007-65 product (2 photos) (Product known of prior to filing of present application).

Reliance 4007-65 Connector, "StopLite Self Retracting" Product Data Sheet, Rev. A 7.11, 1 page (Known of prior to filing present application.).

International Search Report from PCT/US2012/062107, mailed Aug. 5, 2013 (4 pages).

* cited by examiner

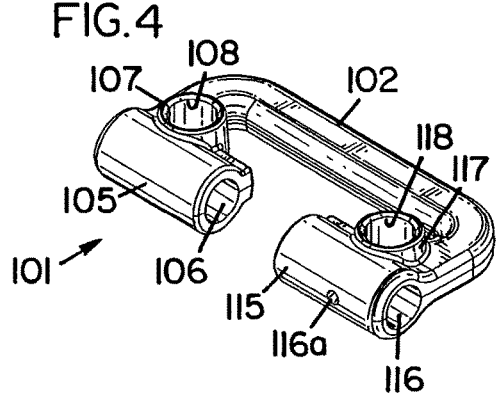
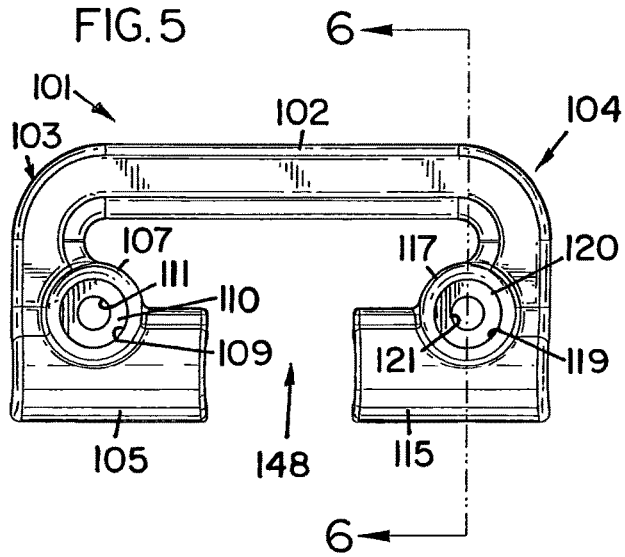
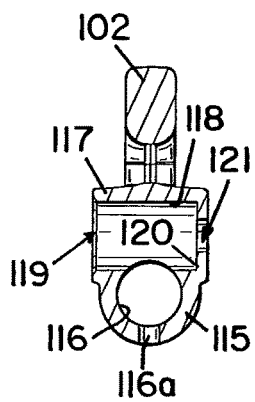
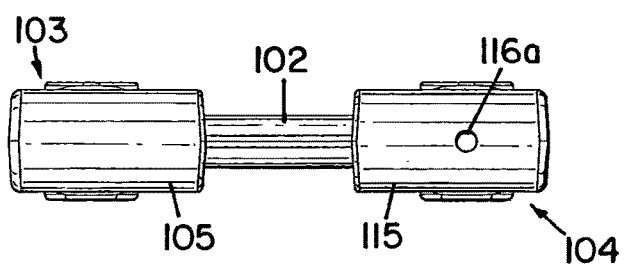

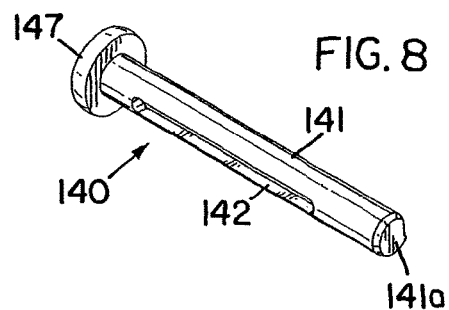
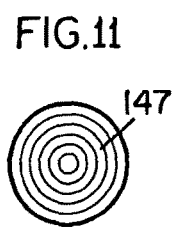
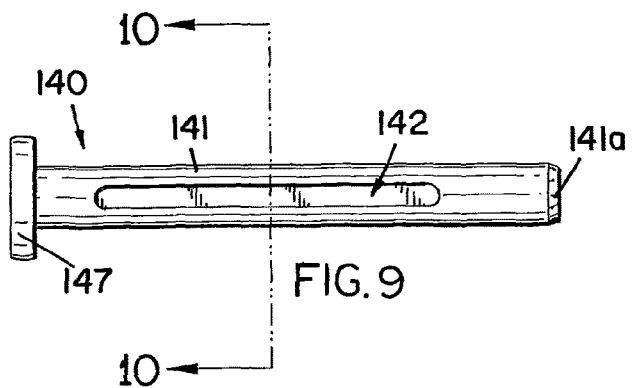
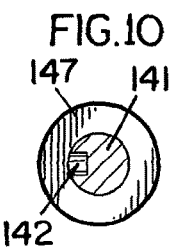
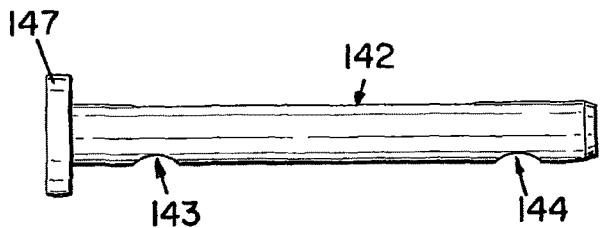
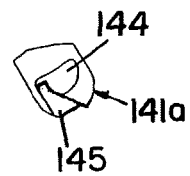
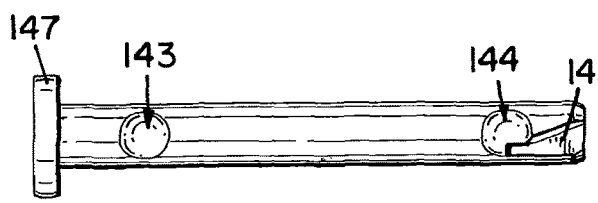
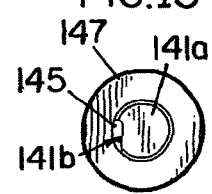
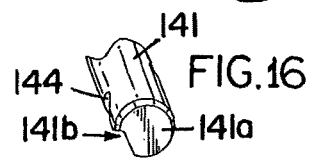

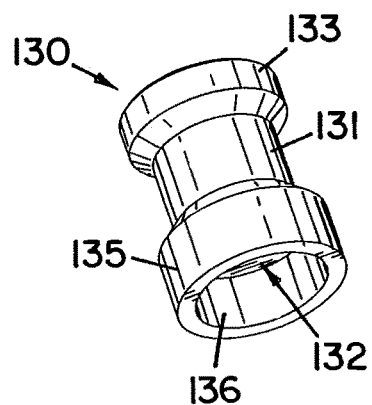
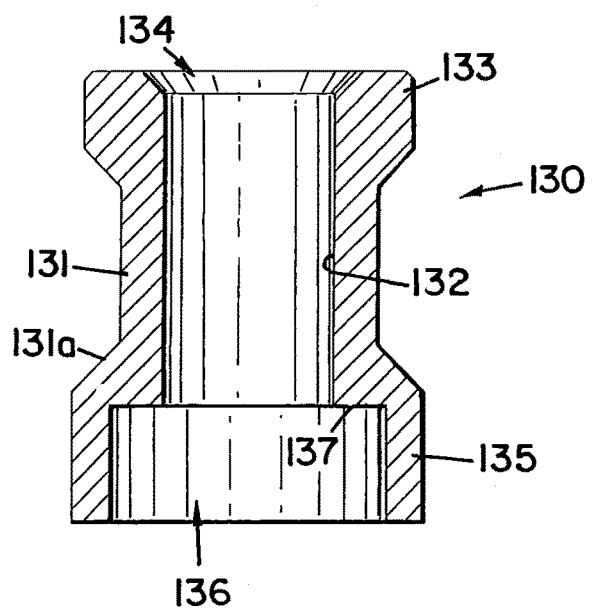
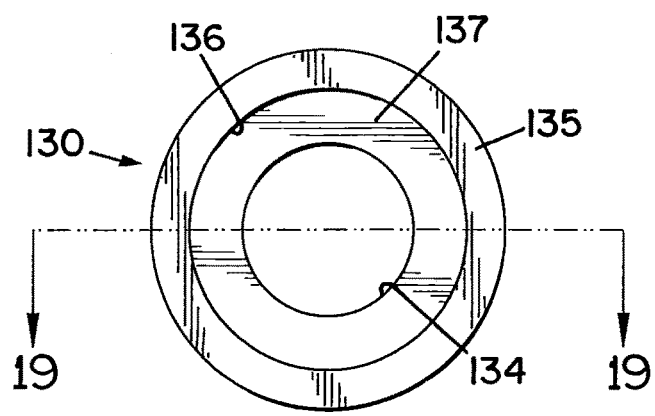

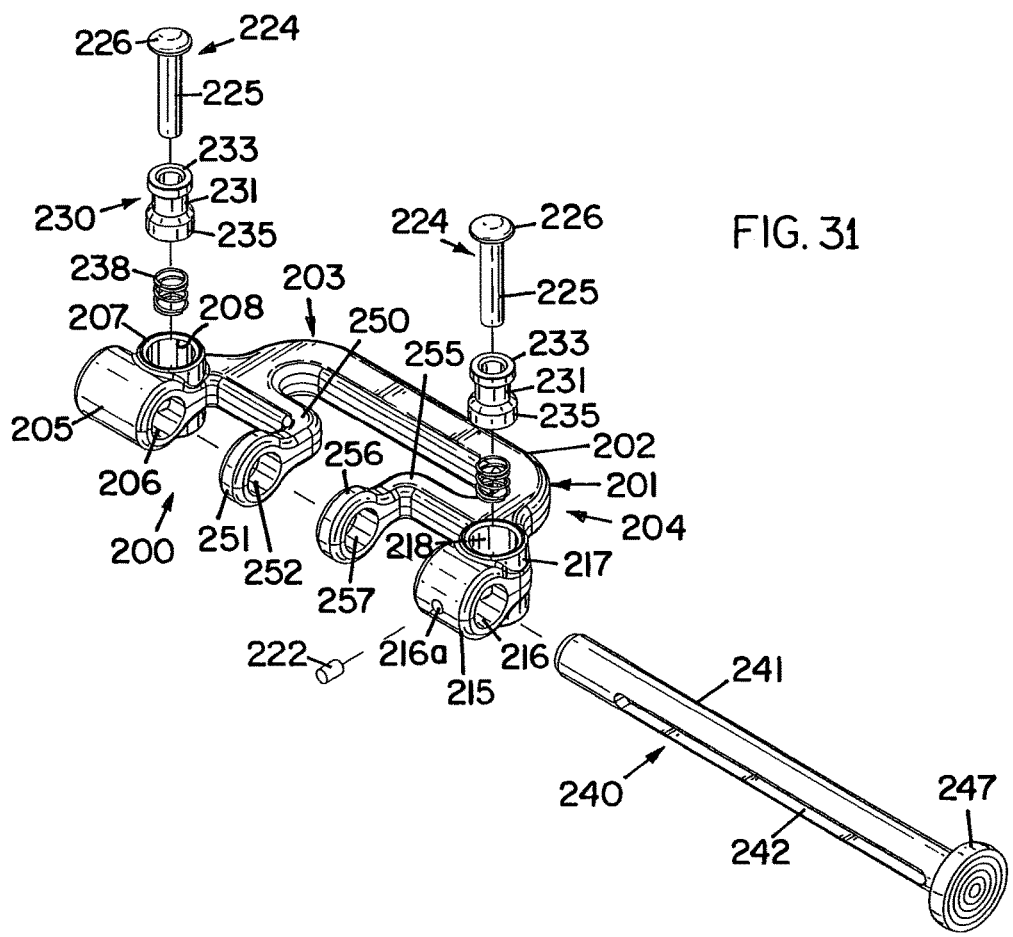
FIG. 31
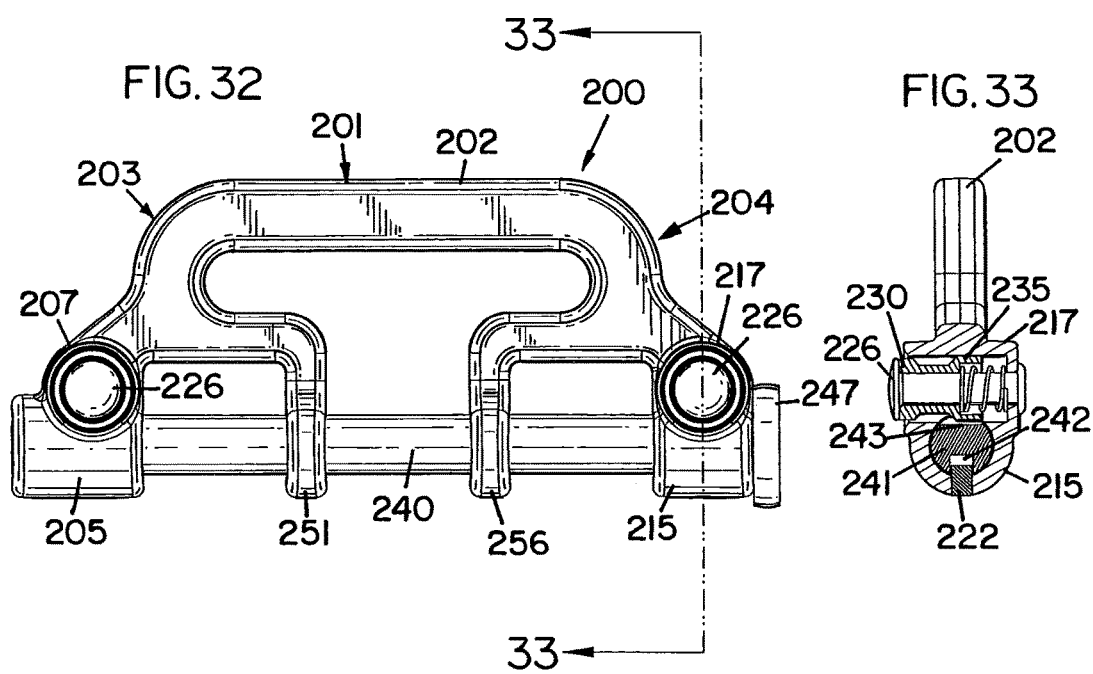
FIG. 32
FIG. 33

US 9,585,439 B2

CONNECTOR

CROSS-REFERENCE TO RELATED APPLICATION

This application claims the benefit of U.S. Provisional Application 61/552,551 filed Oct. 28, 2011 and U.S. patent application Ser. No. 13/660,532 filed Oct. 25, 2012, which are hereby incorporated by reference.

BACKGROUND OF THE INVENTION

Various occupations place people in precarious positions at relatively dangerous heights thereby creating a need for fall-arresting or fall protection safety apparatus. Among other things, such apparatus usually include a safety line interconnected between a support structure and a person working in proximity to the support structure. The safety line is typically secured to a full-body safety harness worn by the worker. A connector may be used to interconnect the safety line and the full-body safety harness. Obviously, it is important that the connector be reliable and able to withstand the forces of a fall. In addition, it is preferred that the connector be user friendly.

For the reasons stated above and for other reasons stated below, which will become apparent to those skilled in the art upon reading and understanding the present specification, there is a need in the art for a connector that is reliable and user friendly.

BRIEF SUMMARY OF THE INVENTION

The above-mentioned problems associated with prior devices are addressed by embodiments of the present invention and will be understood by reading and understanding the present specification. The following summary is made by way of example and not by way of limitation. It is merely provided to aid the reader in understanding some of the aspects of the invention.

In one embodiment, a connector comprises a base, a gate, and a locking member. The base includes a first end and a second end forming an opening. The gate has a shaft slidably operatively connected to the second end and is configured and arranged to span the opening. The locking member has an engaging position and a releasing position. The locking member includes a base portion and a flanged portion. The flanged portion extends outward from the base portion, and the base portion has a smaller diameter than the flanged portion. The flanged portion is configured and arranged to engage the shaft of the gate in the engaging position and secure the gate relative to the base. The base portion is positioned proximate the shaft of the gate in the releasing position and the smaller diameter of the base portion allows the gate to be moved relative to the base.

BRIEF DESCRIPTION OF THE DRAWINGS

The present invention can be more easily understood, and further advantages and uses thereof can be more readily apparent, when considered in view of the detailed description and the following Figures in which:

FIG. 4 is a front perspective view of a base of the connector;

FIG. 5 is a front view of the base shown in FIG. 4;

FIG. 6 is a cross-section view of the base taken along the lines 6-6 in FIG. 5;

FIG. 7 is a bottom view of the base shown in FIG. 4;

FIG. 8 is a front perspective view of a gate of the connector;

FIG. 9 is a bottom view of the gate shown in FIG. 8;

FIG. 10 is a cross-section view of the gate taken along the lines 10-10 in FIG. 9;

FIG. 11 is a side view of the gate shown in FIG. 8;

FIG. 12 is a rear view of the gate shown in FIG. 8;

FIG. 13 is an auxiliary view of the gate shown in FIG. 8 from proximate a middle portion to a distal end of the gate;

FIG. 14 is a top view of the gate shown in FIG. 8;

FIG. 15 is a side view of the gate shown in FIG. 8;

FIG. 16 is an auxiliary view of a portion of the gate shown in FIG. 8;

FIG. 17 is a front perspective view of an engaging member of the connector;

FIG. 18 is a bottom view of the engaging member shown in FIG. 17;

FIG. 19 is a cross-section view of the engaging member taken along the lines 19-19 in FIG. 18;

FIG. 31 is an exploded front perspective view of another embodiment connector constructed in accordance with the principles of the present invention;

FIG. 32 is a front view of the connector shown in FIG. 31;

FIG. 33 is a cross-section view of the connector taken along the lines 33-33 in FIG. 32;

In accordance with common practice, the various described features are not drawn to scale but are drawn to emphasize specific features relevant to the present invention. Reference characters denote like elements throughout the Figures and the text.

DETAILED DESCRIPTION OF THE INVENTION

Figure 1:
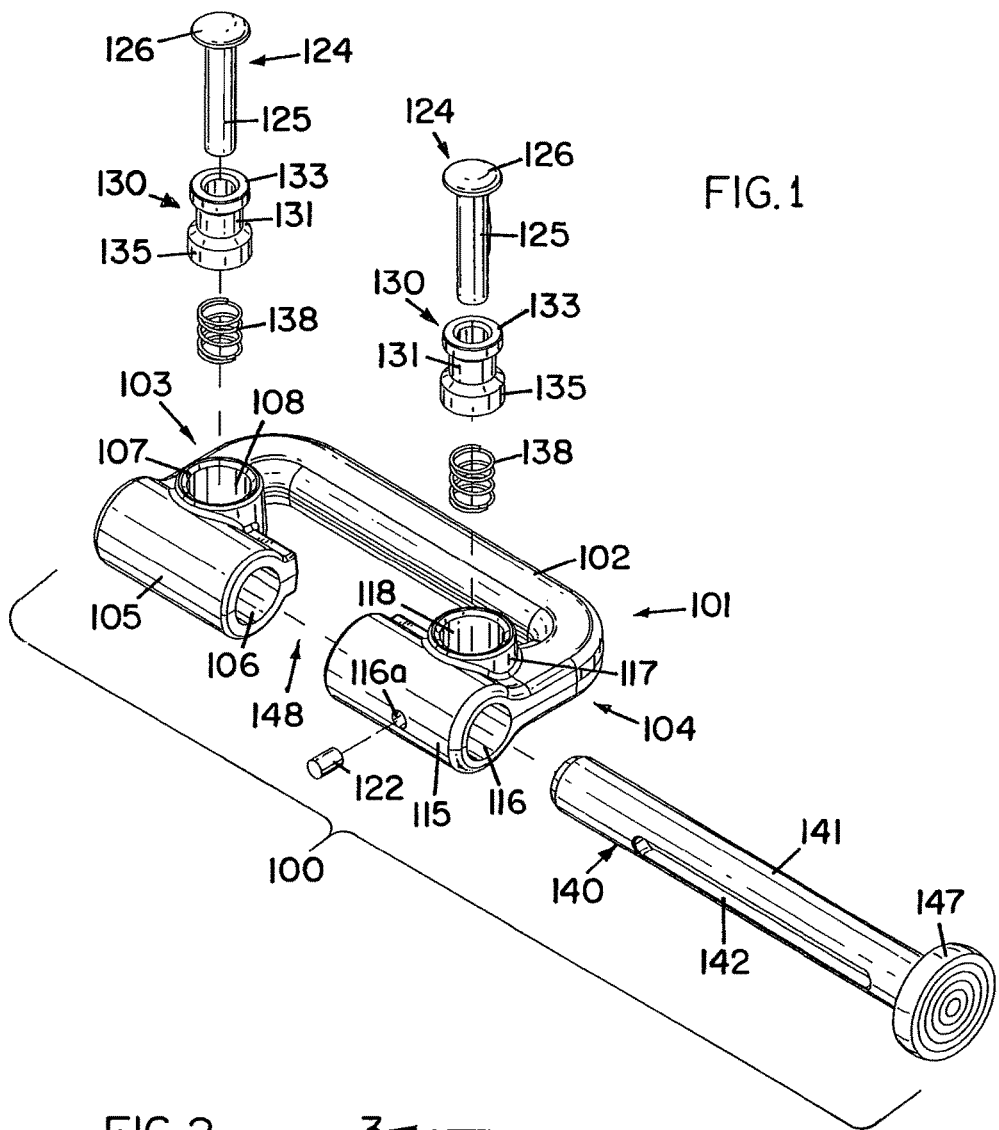
FIG. 1 is an exploded front perspective view of a connector constructed in accordance with the principles of the present invention.

In the following detailed description, reference is made to the accompanying drawings, which form a part hereof, and in which is shown by way of illustration embodiments in which the inventions may be practiced. These embodiments are described in sufficient detail to enable those skilled in the art to practice the invention, and it is to be understood that other embodiments may be utilized and mechanical changes may be made without departing from the spirit and scope of the present invention. The following detailed description is, therefore, not to be taken in a limiting sense, and the scope of the present invention is defined only by the claims and equivalents thereof.

Embodiments of the present invention provide a connector that is user friendly and secure. For example, the connector could be used to interconnect a safety harness and a self-retracting lifeline.

For ease of reference, the embodiments are being described in the orientations in which they are shown. Other orientations are possible, and this description should not limit the orientations in which the connectors are used.

One embodiment connector 100 is shown in FIGS. 1-3 and 29-30. The connector 100 includes a base 101, receiving portions 105 and 115, locking portions 107 and 117, and a gate 140. The base 101 is generally C-shaped and includes an elongate or bar portion 102 with a first end 103, to which a first receiving portion 105 and a first locking portion 107 are operatively connected, and a second end 104, to which a second receiving portion 115 and a second locking portion 117 are operatively connected. The first and second ends 103 and 104 include corners and extension portions that extend downward approximately ninety degrees from the bar portion 102.

The first receiving portion 105 is generally cylindrical with a bore 106 extending parallel to the bar portion 102. One end of the first receiving member 105 is operatively connected to the first end 103 and the remaining portion of the first receiving member 105 extends inward. The first locking portion 107 is positioned proximate the corner where the first end 103 and the first receiving portion 105 are operatively connected. The first locking portion 107 is also generally cylindrical with a bore 108, which is perpendicular to the bore 106, and the bores 106 and 108 intersect so that they are in fluid communication with one another. The first locking portion 107 includes a larger opening 109 proximate the front and a bottom 110 with a smaller opening 111 proximate the rear as shown in FIGS. 5 and 6.

The second receiving portion 115 is generally cylindrical with a bore 116 extending parallel to the bar portion 102. One end of the second receiving member 115 is operatively connected to the second end 104 and the remaining portion of the second receiving member 115 extends inward. The second locking portion 117 is positioned proximate the corner where the second end 104 and the second receiving portion 115 are operatively connected. The second locking portion 117 is also generally cylindrical with a bore 118, which is perpendicular to the bore 116, and the bores 116 and 118 intersect so that they are in fluid communication with one another. The second locking portion 117 includes a larger opening 119 proximate the front and a bottom 120 with a smaller opening 121 proximate the rear as shown in FIGS. 5 and 6. The second receiving portion 115 also includes a lateral bore 116a on its bottom, which is opposite the second locking portion 117. The lateral bore 116a aligns with the juncture of the bores 116 and 118 and is configured and arranged to receive a retaining pin 122. The receiving portions 105 and 115 form an opening 148 therebetween.

Each of the first locking portion 107 and the second locking portion 117 is configured and arranged to receive a biasing member 138, an engaging member 130, and a rivet 124. These components form a locking mechanism. The rivet 124 includes a head 126 operatively connected to one end of a shaft 125, which has a distal end 125a opposite the head 126. The engaging member 130 includes a cylindrical base portion 131 to which a first flanged portion 133 is operatively connected proximate one end and a second flanged portion 135 is operatively connected proximate the other end. A bore 132 extends through the engaging member 130, and an opening 134 in the first flanged portion 133 and an opening 136 in the second flanged portion 135 provide access to the bore 132. The opening 136 in the second flanged portion 135 is larger than the bore 132 to form a ledge portion 137 inside the engaging member 130 proximate the juncture of the base portion 131 and the second flanged portion 135. This is shown in FIGS. 18 and 19. The biasing member 138 is configured and arranged to fit within the opening 136 of the second flanged portion 135 and one end of the biasing member 138 contacts the ledge portion 137. Along with the engaging member 130, the biasing member 138 is also configured and arranged to fit within the bore 108 or 118 of the locking portion 107 or 108 so that the other end of the biasing member 138 contacts the bottom 110 or 120.

Figure 3A:
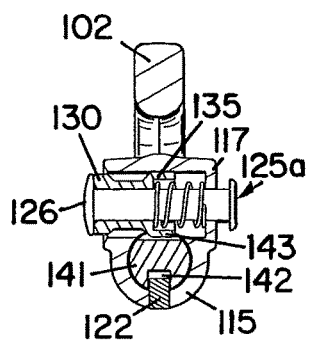
FIG. 3A is a cross-section view of the connector taken along the lines 3-3 in FIG. 2 in an engaging position.
Figure 3B:
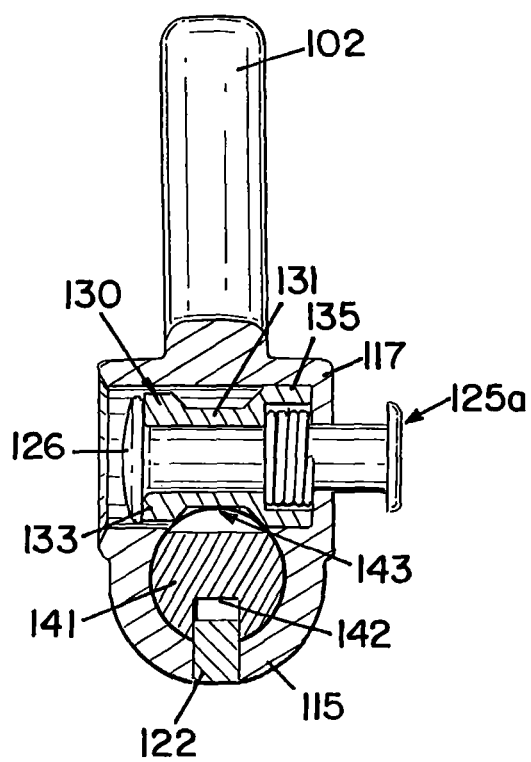
FIG. 3B is a cross-section view of the connector shown in FIG. 3A in a releasing position.
Figure 20:
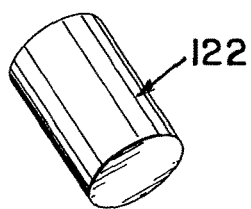
FIG. 20 is a front perspective view of a retaining pin of the connector.
Figure 22:
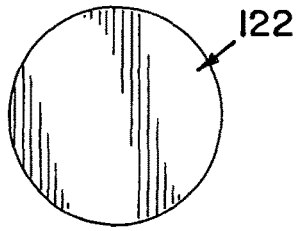
FIG. 22 is a bottom view of the retaining pin shown in FIG. 20.
Figure 21:
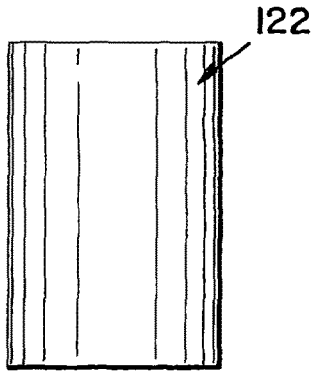
FIG. 21 is a front view of the retaining pin shown in FIG. 20.
Figure 23:
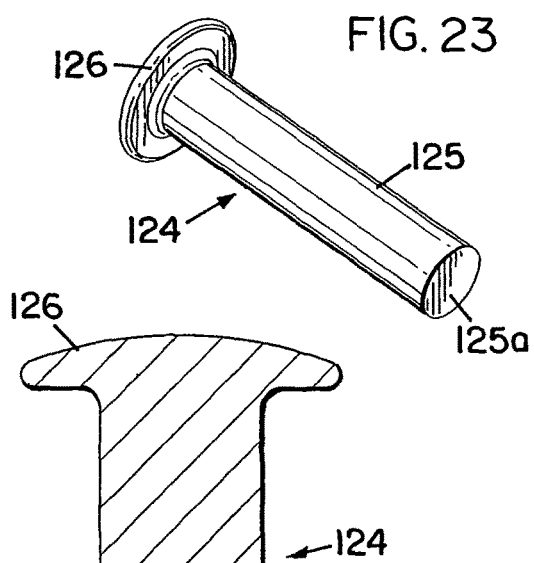
FIG. 23 is a front perspective view of a rivet of the connector.
Figure 25:
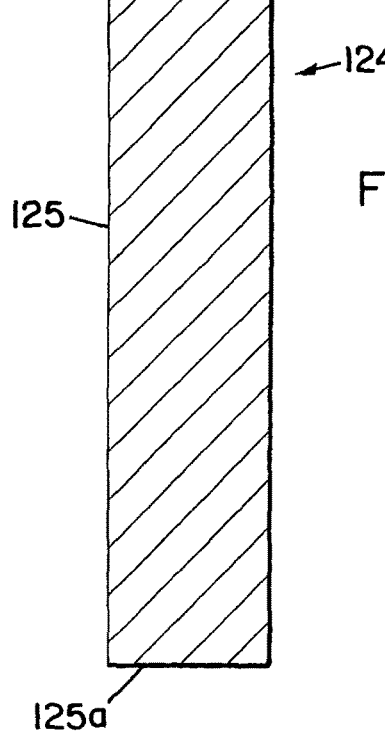
FIG. 25 is a cross-section view of the rivet taken along the lines 25-25 in FIG. 24.
Figure 24:
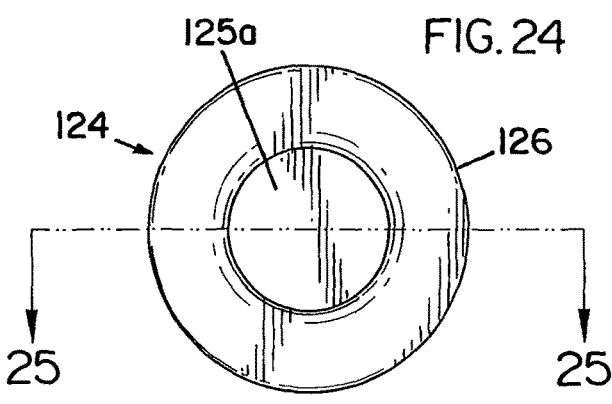
FIG. 24 is a bottom view of the rivet shown in FIG. 23.
Figure 26:
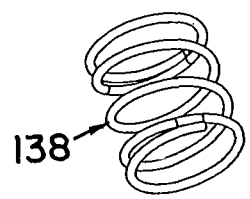
FIG. 26 is a front perspective view of a biasing member of the connector.
Figure 27:
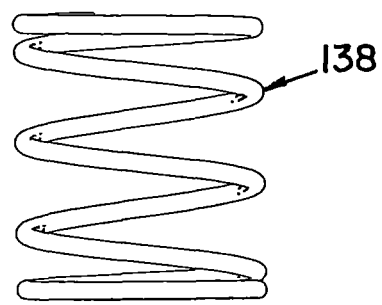
FIG. 27 is a bottom view of the biasing member shown in FIG. 26.
Figure 28:
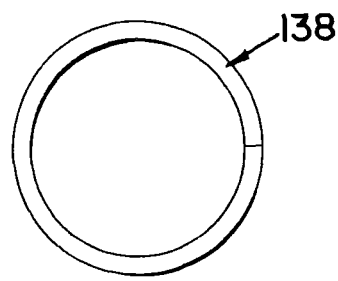
FIG. 28 is a front view of the biasing member shown in FIG. 26.

The rivet 124 extends through the bore 132 of the engaging member 130, the bore of the biasing member 138, and the bore 108 or 118 of the locking portion 107 or 117 and then the distal end 125a is deformed, as shown in FIG. 3, by means well known in the art to secure the rivet 124 to the locking portion 107 or 117. The rivet 124 captures the engaging member 130 and the biasing member 138 within with bore 108 or 118 between the head 126 and the deformed distal end 125a. The ends of the biasing member 138 contact the ledge portion 137 and the bottom 110 or 120 and place a biasing force on the engaging member 130 to bias the engaging member 130 to an engaging position, which is shown in FIG. 3A. An opposing force can be placed on the head 126 of the rivet 124 to compress the biasing member 138 and move the engaging member 130 from the engaging position to a releasing position, which is shown in FIG. 3B.

The gate 140 includes a head 147 operatively connected to one end of a shaft 141, which has a distal end 141a opposite the head 147. The bottom side of the shaft 141 includes a slot 142 that extends along an intermediate portion of the shaft 141. The top side of the shaft 141 includes a first notch 143 proximate the head 147 and a second notch 144 proximate the distal end 141a. A ramp portion 145 extends from the second notch 144 to the distal end 141a, and the distal end 141a includes a notched portion 141b to provide access to the ramp portion 145.

Before the retaining pin 122 is positioned within the lateral bore 116a, at least the locking mechanism proximate the second receiving portion 115 is moved into its releasing position and the distal end 141a of the gate 140 is inserted into the bore 116 until at least the slot 142 of the gate 140 is aligned with the bore 116a. Then the retaining pin 122 is friction fit within the lateral bore 116a and extends into the bore 116 to fit within the slot 142 as show in FIG. 3. The retaining pin 122 acts as a stop member to prevent the gate 140 from sliding all the way out of the second receiving portion 115. Because the retaining pin 122 fits within the slot 142, when the retaining pin 122 contacts the gate 140 proximate the end of the slot 142 proximate the distal end 141a, the gate 140 cannot be slid further out of the second receiving portion 115.

Figure 2:
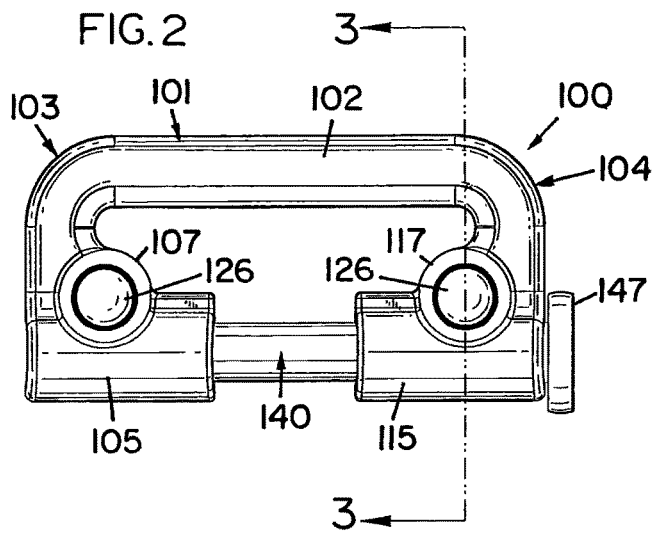
FIG. 2 is a front view of the connector shown in FIG. 1.

When assembled, as shown in FIGS. 2 and 3, the gate 140 is positioned within the bores 106 and 116 of the base's first and second receiving portions 105 and 115. The retaining pin 122 is positioned within the slot 142, and the second flanged portions 135 of the engaging members 130 are positioned within the notches 143 and 144 of the gate 140. The gate 140 includes a slot 142 in which the retaining pin 122 is positioned to not only act as a stop member, as discussed above, but to keep the gate 140 in the desired orientation so that the notches 143 and 144 can be engaged by the locking mechanisms. Thus, the notches 143 and 144 are engaging portions configured and arranged to be engaged by the locking mechanisms. Each locking mechanism includes the locking portion 107 or 117, the biasing member 138, the engaging member 130, and the rivet 124.

In operation, to release the gate 140, the heads 126 of both rivets 124 are pressed downward into the respective locking portions 107 and 117 so that the biasing members 138 are compressed and the engaging members 130 move downward. Each locking mechanism operates independently of the other. Therefore, both locking mechanisms need to be in the releasing position to allow the gate to be opened. As the engaging members 130 move downward, the second flanged portions 135 move out of the notches 143 and 144 and the cylindrical base portions 131 are positioned proximate the notches 143 and 144 as shown in FIG. 3B. When the cylindrical base portions 131 are positioned proximate the notches 143 and 144, the gate 140 is no longer engaged by the locking mechanisms and there is enough clearance to slide the gate 140 completely out of the first receiving portion 105. Because of the retaining pin 122, the gate 140 cannot be completely slid out of the second receiving portion 115.

When the gate 140 is slid out of the first receiving portion 105, the locking mechanism returns to the engaging position due to the biasing force exerted on the engaging member 130 by the biasing member 138. Because the gate 140 remains in the second receiving portion 115 and the notch 144 is not proximate the locking mechanism, the locking mechanism remains in the releasing position.

Figure 29:
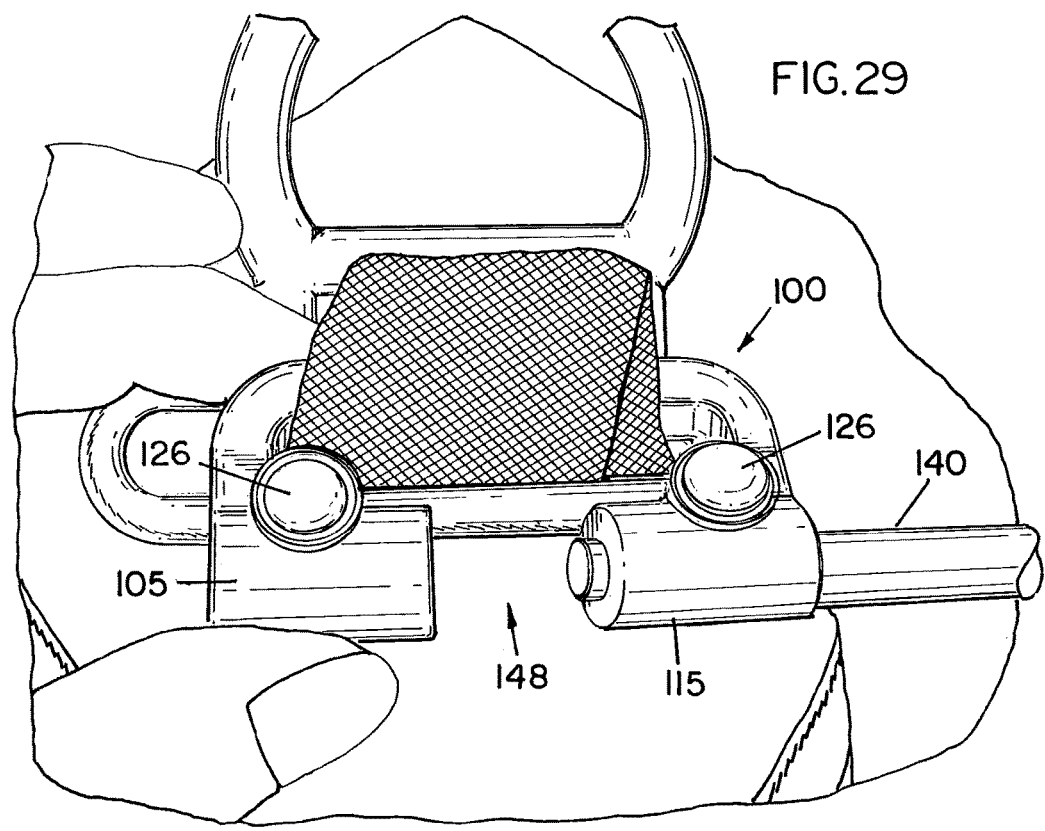
FIG. 29 is a front view of the connector shown in FIG. 1 operatively connected to a safety harness.
Figure 30:
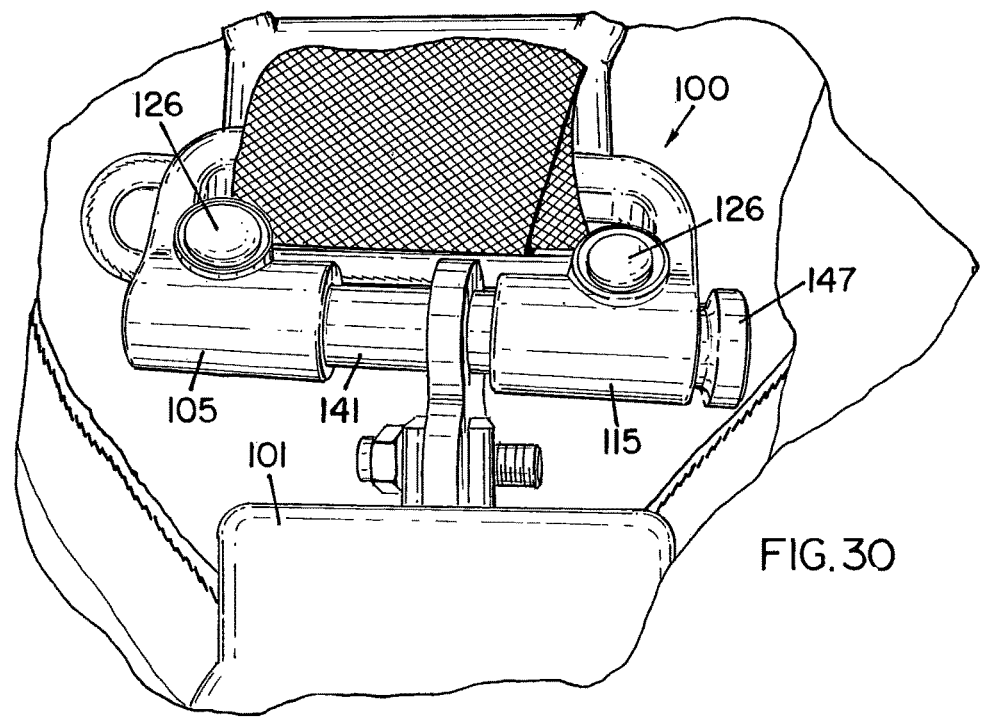
FIG. 30 is a front view of the connector shown in FIG. 1 operatively connected to a safety harness and to a self-retracting lifeline.
Figure 34:
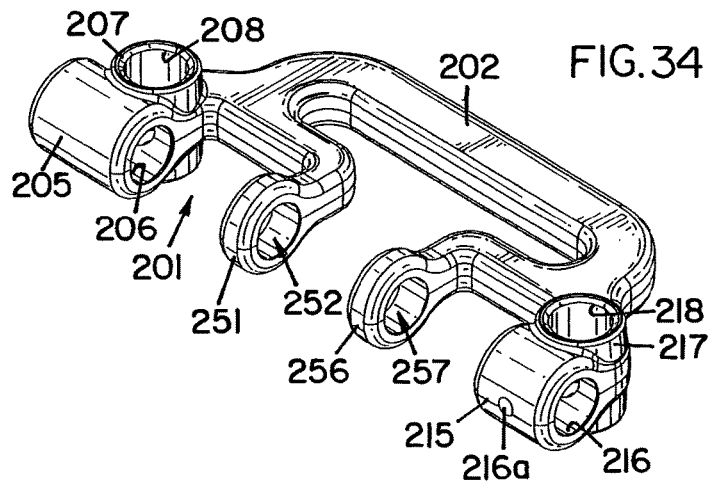
FIG. 34 is a front perspective view of a base of the connector.

When the gate 140 is moved from a closed position to an open position, the opening 148 between the receiving portions 105 and 115 is accessible and, as shown in FIGS. 29 and 30, the connector 100 may be connected to straps of a safety harness. After the straps have been positioned within the opening 148, the gate 140 is moved from the open position to the closed position to capture the straps between the bar portion 102 and the gate 140. A safety device, such as a self-retracting lifeline, may be connected to the gate 140 before the gate 140 is slid into the first receiving portion 105 by positioning an aperture of the self-retracting lifeline's connector portion between the receiving portions 105 and 115 and then sliding the gate 140 through the connector portion's aperture. To move the gate 140 from the open position into the closed position, the gate 140 is simply slid back into the receiving portions 105 and 115. When the distal end 141a of the gate 140 is slid into the first receiving portion 105, the notched portion 141b and the ramp portion 145 allow the end of the gate 140 proximate the distal end 141a to be slid past the engaging member 130. The ramp portion 145 of the gate 140 contacts the angled surface 131a, which interconnects the base portion 131 and the second flanged portion 135 of the engaging member 130, and pushes the engaging member 130 so that the biasing member 138 compresses and the base portion 131 is proximate the notch 143. When the notches 143 and 144 are positioned proximate the respective locking mechanisms, the locking mechanisms return to the engaging positions due to the biasing forces exerted on the engaging members 130 by the biasing members 138 and the gate 140 cannot be slid outward until both of the locking mechanisms are in the releasing positions.

Another embodiment connector 200 is shown in FIGS. 31-33. The connector 200 includes a base 201, receiving portions 205 and 215, extension portions 250 and 255, locking portions 207 and 217, and a gate 240. The base 201 is generally C-shaped and includes an elongate or bar portion 202 with a first end 203 and a second end 204. The first and second ends 203 and 204 include corners and extension portions that extend downward approximately ninety degrees from the bar portion 202. A first receiving portion 205, a first extension portion 250, and a first locking portion 207 are operatively connected to the first end 203, and a second receiving portion 215, a second extension portion 255, and a second locking portion 217 are operatively connected to the second end 204.

Figure 35:
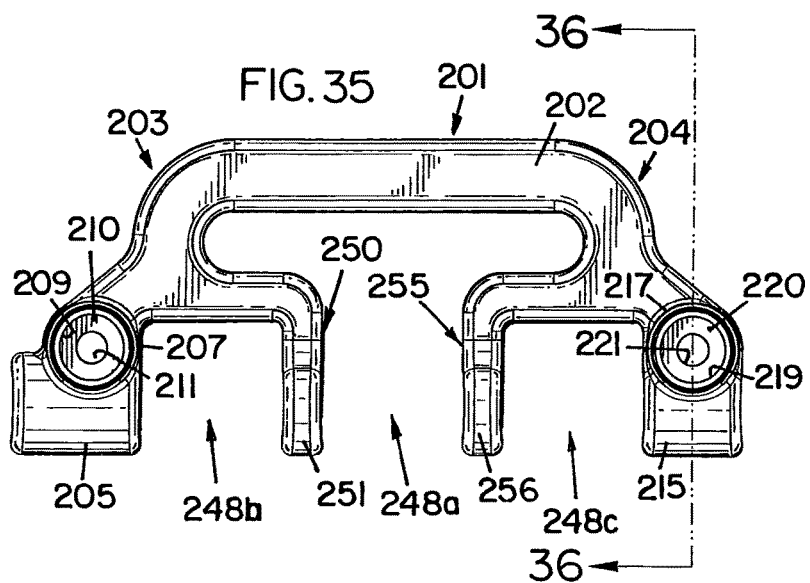
FIG. 35 is a front view of the base shown in FIG. 34.
Figure 36:
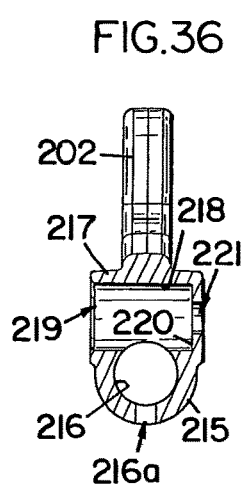
FIG. 36 is a cross-section view of the base taken along the lines 36-36 in FIG. 35.
Figure 37:
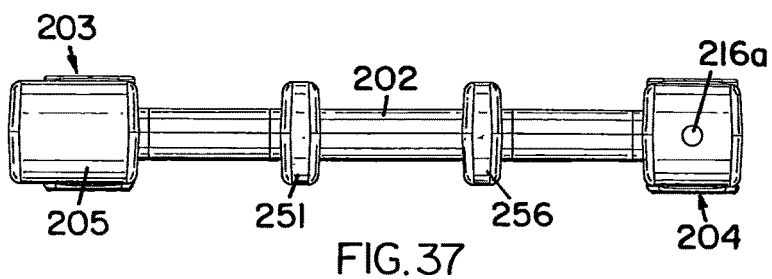
FIG. 37 is a bottom view of the base shown in FIG. 34.
Figure 38:
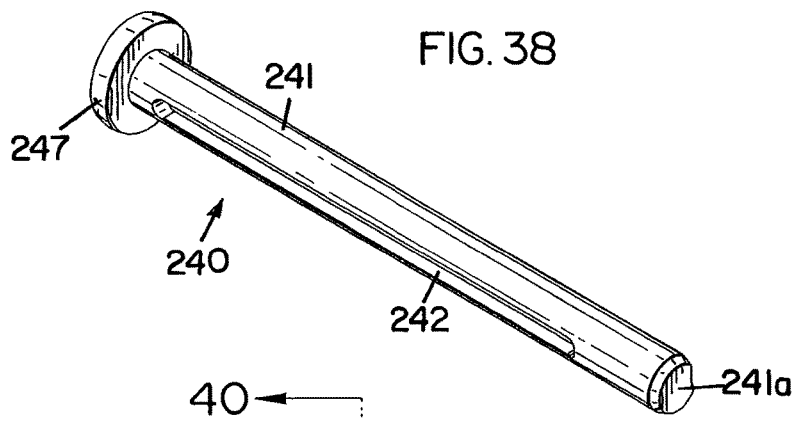
FIG. 38 is a front perspective view of a gate of the connector.
Figure 41:
FIG. 41 is a side view of the gate shown in FIG. 38.
Figure 39:
FIG. 39 is a bottom view of the gate shown in FIG. 38.
Figure 40:
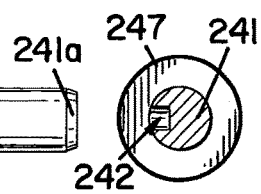
FIG. 40 is a cross-section view of the gate taken along the lines 40-40 in FIG. 39.
Figure 42:
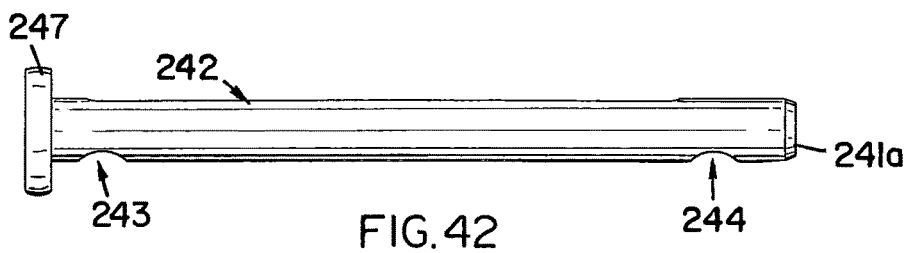
FIG. 42 is a rear view of the gate shown in FIG. 38.
Figure 43:
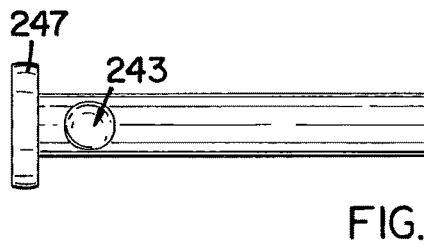
FIG. 43 is a top view of the gate shown in FIG. 38.
Figure 44:
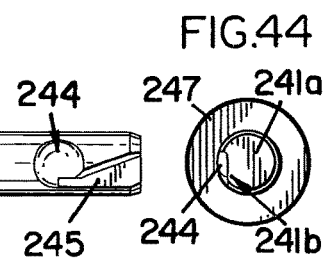
FIG. 44 is a side view of the gate shown in FIG. 38.
Figure 45:
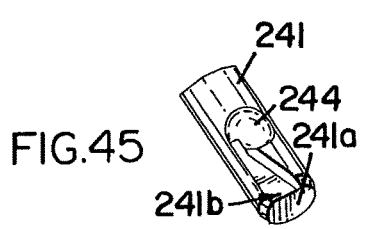
FIG. 45 is an auxiliary view of a portion of the gate shown in FIG. 38.
Figure 46:
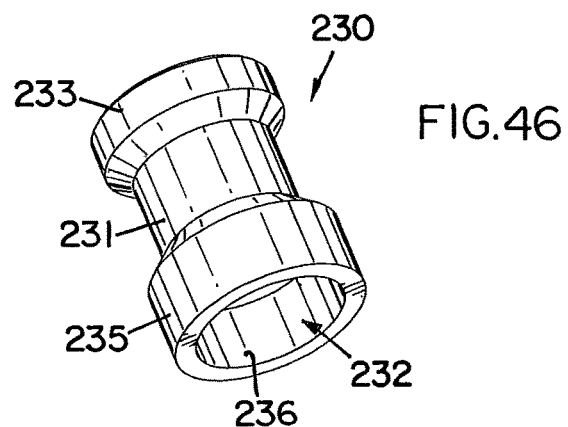
FIG. 46 is a front perspective view of an engaging member of the connector.

Two prongs, an outer prong and an inner prong, extend outward from the first end 203. Operatively connected to the outer prong is the first receiving portion 205, which is generally cylindrical with a bore 206 extending parallel to the bar portion 202. Operatively connected to the inner prong is the first extension portion 250, which includes a ring portion 251 with an aperture 252 in alignment with the bore 206 of the first receiving portion 205. The first locking portion 207 is positioned proximate the juncture of the outer prong and the first receiving portion 205. The first locking portion 207 is also generally cylindrical with a bore 208, which is perpendicular to the bore 206, and the bores 206 and 208 intersect so that they are in fluid communication with one another. The first locking portion 207 includes a larger opening 209 proximate the front and a bottom 210 with a smaller opening 211 proximate the rear as shown in FIGS. 35 and 36.

Two prongs, an outer prong and an inner prong, extend outward from the second end 204. Operatively connected to the outer prong is the second receiving portion 215, which is generally cylindrical with a bore 216 extending parallel to the bar portion 202. Operatively connected to the inner prong is the second extension portion 255, which includes a ring portion 256 with an aperture 257 in alignment with the bore 216 of the second receiving portion 215. The second locking portion 217 is positioned proximate the juncture of the outer prong and the second receiving portion 215. The second locking portion 217 is also generally cylindrical with a bore 218, which is perpendicular to the bore 216, and the bores 216 and 218 intersect so that they are in fluid communication with one another. The second locking portion 217 includes a larger opening 219 proximate the front and a bottom 220 with a smaller opening 221 proximate the rear as shown in FIGS. 35 and 36. The second receiving portion 215 also includes a lateral bore 216*a* on its bottom, which is opposite the second locking portion 217. The lateral bore 216*a* aligns with the juncture of the bores 216 and 218 and is configured and arranged to receive a retaining pin 222. The extension portions 250 and 255 form an opening 248*a* therebetween, the first receiving portion 205 and the first extension portion 250 form an opening 248*b* therebetween, and the second receiving portion 215 and the second extension portion 255 form an opening 248*c* therebetween.

Figure 48:
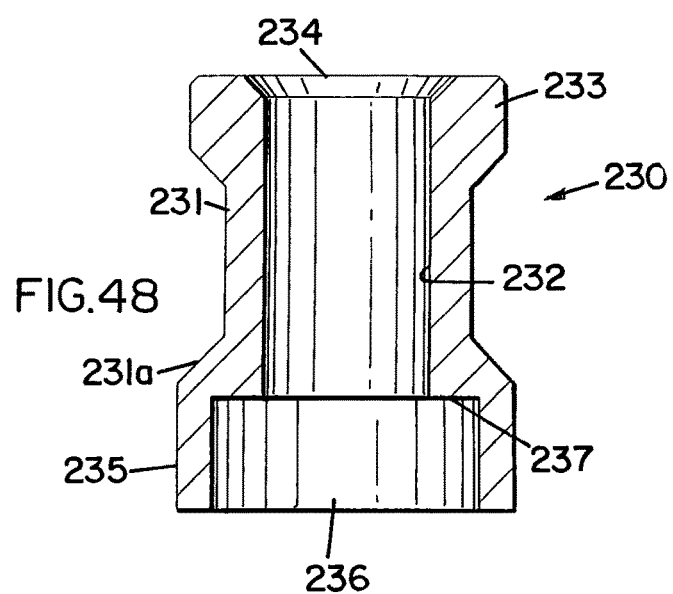
FIG. 48 is a cross-section view of the engaging member taken along the lines 48-48 in FIG. 47.
Figure 47:
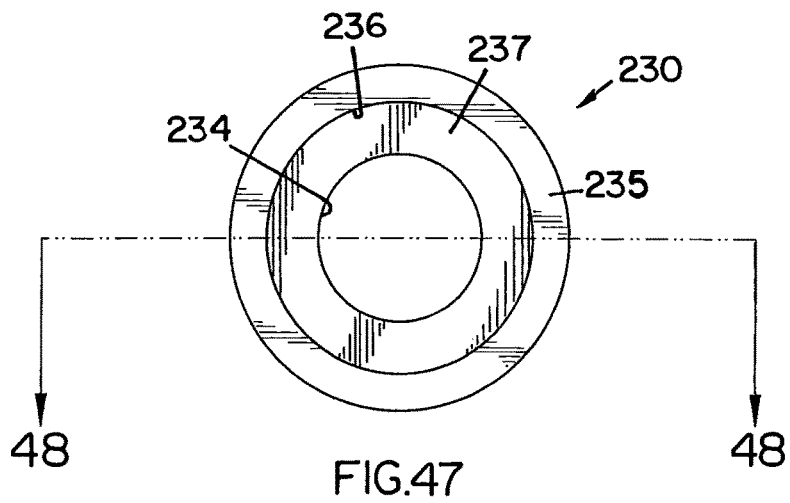
FIG. 47 is a bottom view of the engaging member shown in FIG. 46.
Figure 49:
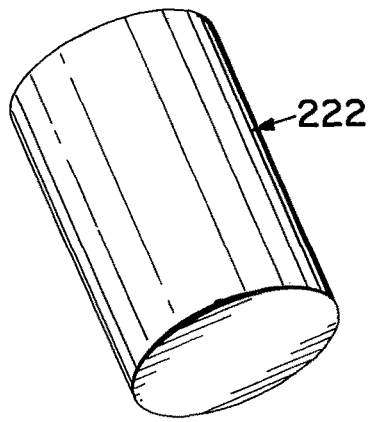
FIG. 49 is a front perspective view of a retaining pin of the connector.
Figure 52:
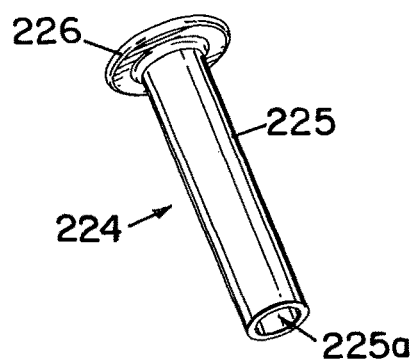
FIG. 52 is a bottom perspective view of a rivet of the connector.
Figure 50:
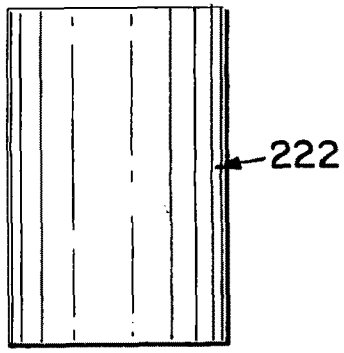
FIG. 50 is a front view of the retaining pin shown in FIG. 49.
Figure 53:
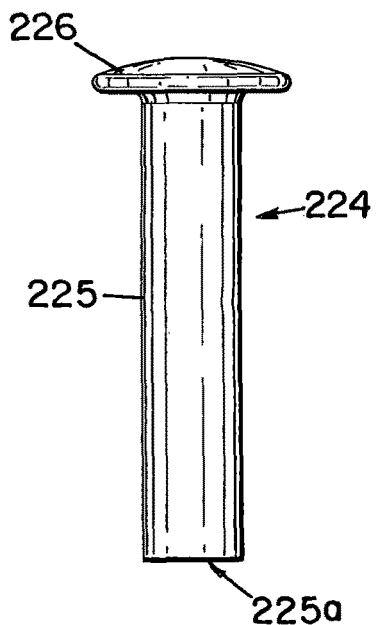
FIG. 53 is a bottom view of the rivet shown in FIG. 52.
Figure 51:
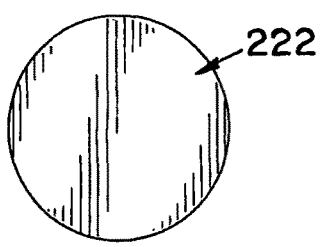
FIG. 51 is a bottom view of the retaining pin shown in FIG. 49.
Figure 54:
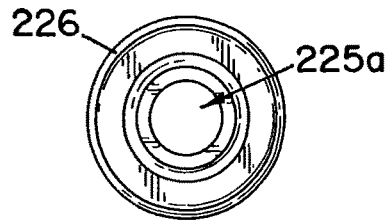
FIG. 54 is a rear view of the rivet shown in FIG. 52.
Figure 55:
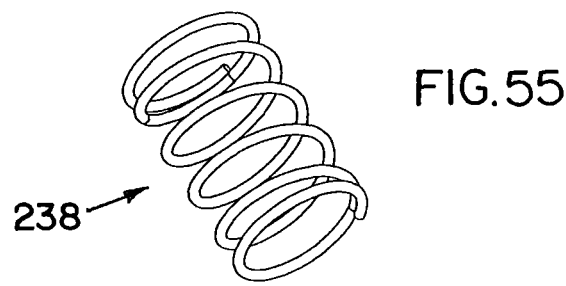
FIG. 55 is a bottom perspective view of a biasing member of the connector.
Figure 56:
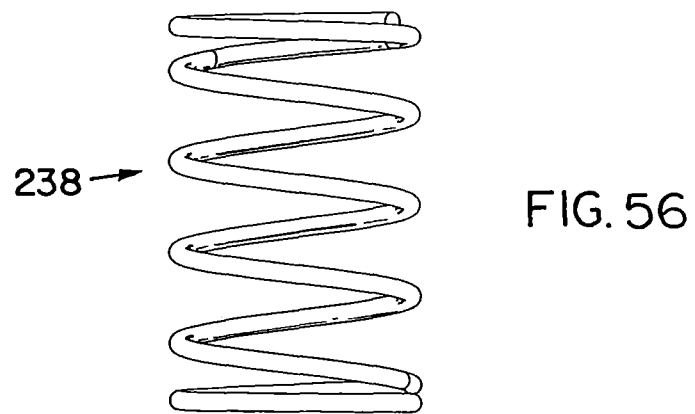
FIG. 56 is a bottom view of the biasing member shown in FIG. 55.
Figure 57:
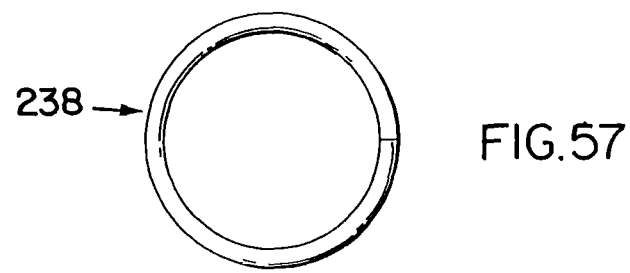
FIG. 57 is a rear view of the biasing member shown in FIG. 55.

Each of the first locking portion 207 and the second locking portion 217 is configured and arranged to receive a biasing member 238, an engaging member 230, and a rivet 224. These components form a locking mechanism. The rivet 224 includes a head 226 operatively connected to one end of a shaft 225, which has a distal end 225*a* opposite the head 226. The engaging member 230 includes a cylindrical base portion 231 to which a first flanged portion 233 is operatively connected proximate one end and a second flanged portion 235 is operatively connected proximate the other end. A bore 232 extends through the engaging member 230, and an opening 234 in the first flanged portion 233 and an opening 236 in the second flanged portion 235 provide access to the bore 232. The opening 236 in the second flanged portion 235 is larger than the bore 232 to form a ledge portion 237 inside the engaging member 230 proximate the juncture of the base portion 231 and the second flanged portion 235. This is shown in FIGS. 47 and 48. The biasing member 238 is configured and arranged to fit within the opening 236 of the second flanged portion 235 and one end of the biasing member 238 contacts the ledge portion 237. Along with the engaging member 230, the biasing member 238 is also configured and arranged to fit within the bore 208 or 218 of the locking portion 207 or 208 so that the other end of the biasing member 238 contacts the bottom 210 or 220.

The rivet 224 extends through the bore 232 of the engaging member 230, the bore of the biasing member 238, and the bore 208 or 218 of the locking portion 207 or 217 and then the distal end 225*a* is deformed, as shown in FIG. 33, by means well known in the art to secure the rivet 224 to the locking portion 207 or 217. The rivet 224 captures the engaging member 230 and the biasing member 238 within with bore 208 or 218 between the head 226 and the deformed distal end 225*a*. The ends of the biasing member 238 contact the ledge portion 237 and the bottom 210 or 220 and place a biasing force on the engaging member 230 to bias the engaging member 230 to an engaging position. An opposing force can be placed on the head 226 of the rivet 224 to compress the biasing member 238 and move the engaging member 230 from the engaging position to a releasing position.

The gate 240 includes a head 247 operatively connected to one end of a shaft 241, which has a distal end 241*a* opposite the head 247. The bottom side of the shaft 241 includes a slot 242 that extends along an intermediate portion of the shaft 241. The top side of the shaft 241 includes a first notch 243 proximate the head 247 and a second notch 244 proximate the distal end 241*a*. A ramp portion 245 extends from the second notch 244 to the distal end 241*a*, and the distal end 241*a* includes a notched portion 241*b* to provide access to the ramp portion 245.

Before the retaining pin 222 is positioned within the lateral bore 216*a*, at least the locking mechanism proximate the second receiving portion 215 is moved into its releasing position and the distal end 241*a* of the gate 240 is inserted into the bore 216 until at least the slot 242 of the gate 240 is aligned with the bore 216*a*. Then the retaining pin 222 is friction fit within the lateral bore 216*a* and extends into the bore 216 to fit within the slot 242 as show in FIG. 33. The retaining pin 222 acts as a stop member to prevent the gate 240 from sliding all the way out of the second receiving portion 215. Because the retaining pin 222 fits within the slot 242, when the retaining pin 222 contacts the gate 240 proximate the end of the slot 242 proximate the distal end 241*a*, the gate 240 cannot be slid further out of the second receiving portion 215.

When assembled, as shown in FIGS. 32 and 33, the gate 240 is positioned within the bores 206 and 216 of the base's first and second receiving portions 205 and 215 and within the apertures 252 and 257 of the base's first and second extension portions 250 and 255. The retaining pin 222 is positioned within the slot 242, and the second flanged portions 235 of the engaging members 230 are positioned within the notches 243 and 244 of the gate 240. The gate 240 includes a slot 242 in which the retaining pin 222 is positioned to not only act as a stop member, as discussed above, but to keep the gate 240 in the desired orientation so that the notches 243 and 244 can be engaged by the locking mechanisms. Thus, the notches 243 and 244 are engaging portions configured and arranged to be engaged by the locking mechanisms. Each locking mechanism includes the locking portion 207 or 217, the biasing member 238, the engaging member 230, and the rivet 224.

In operation, to release the gate 240, the heads 226 of both rivets 224 are pressed downward into the respective locking portions 207 and 217 so that the biasing members 238 are compressed and the engaging members 230 move downward. Each locking mechanism operates independently of the other. Therefore, both locking mechanisms need to be in the releasing position to allow the gate to be opened. As the engaging members 230 move downward, the second flanged portions 235 move out of the notches 243 and 244 and the cylindrical base portions 231 are positioned proximate the notches 243 and 244. When the cylindrical base portions 231 are positioned proximate the notches 243 and 244, the gate 240 is no longer engaged by the locking mechanisms and there is enough clearance to slide the gate 240 completely out of the first receiving portion 205. Because of the retaining pin 222, the gate 240 cannot be completely slid out of the second receiving portion 215.

When the gate 240 is slid out of the first receiving portion 205, the locking mechanism returns to the engaging position due to the biasing force exerted on the engaging member 230 by the biasing member 238. Because the gate 240 remains in the second receiving portion 215 and the notch 244 is not proximate the locking mechanism, the locking mechanism remains in the releasing position.

When the gate 240 is moved from a closed position to an open position, the openings 248a, 248b, and 248c are accessible and the connector 200 may be connected to straps of a safety harness and a safety device such as a self-retracting lifeline. After the straps have been positioned within the opening 248a, the gate 240 is moved from the open position to the closed position to capture the straps between the bar portion 202 and the gate 240. The safety device, such as a self-retracting lifeline, is connected to the gate 240 before the gate 240 is slid into at least the first extension portion 250 and the first receiving portion 205 by positioning an aperture of the self-retracting lifeline's connector portion between the extension portions 250 and 255 and then sliding the gate 240 through the connector portion's aperture. If it is desired to connect two safety devices to the connector 200, a first device is similarly connected between the first receiving portion 205 and the first extension portion 250 and a second device is similarly connected between the second extension portion 255 and the second receiving portion 215. If it is desired to connect three safety devices to the connector 200, a device is similarly connected to the gate 240 proximate each of the openings 248a, 248b, and 248c. To move the gate 240 from the open position into the closed position, the gate 240 is simply slid through the receiving portion 215, the apertures 257 and 252, and back into the receiving portion 205. When the distal end 241a of the gate 240 is slid into the first receiving portion 205, the notched portion 241b and the ramp portion 245 allow the end of the gate 240 proximate the distal end 241a to be slid past the engaging member 230. The ramp portion 245 of the gate 240 contacts the angled surface 231a, which interconnects the base portion 231 and the second flanged portion 235 of the engaging member 230, and pushes the engaging member 230 so that the biasing member 238 compresses and the base portion 231 is proximate the notch 243. When the notches 243 and 244 are positioned proximate the respective locking mechanisms, the locking mechanisms return to the engaging positions due to the biasing forces exerted on the engaging members 230 by the biasing members 238 and the gate 240 cannot be slid outward until both of the locking mechanisms are in the releasing positions.

The above specification, examples, and data provide a complete description of the manufacture and use of the composition of embodiments of the invention. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the invention. Therefore, it is manifestly intended that this invention be limited only by the claims and the equivalents thereof.

The invention claimed is:

1. A connector, comprising:
a base including a first end and a second end, the base forming a first opening;
a gate having a shaft slidably operatively connected to the second end and configured and arranged to span between the first and second ends; and
a locking member operatively connected to the base and having an engaging position and a releasing position, the locking member including a base portion and a flanged portion, the flanged portion extending outward from the base portion, the base portion having a smaller diameter than the flanged portion, the flanged portion configured and arranged to engage the shaft of the gate in the engaging position and secure the gate relative to the base, the base portion being positioned proximate the shaft of the gate in the releasing position and the smaller diameter of the base portion allowing the gate to be moved relative to the base, the flanged portion being positioned within the base in both the engaging position and the releasing position;
wherein the locking member is positioned within the first opening.

2. The connector of claim 1, wherein the gate is configured and arranged to move relative to the base in a first direction, and the locking member is configured and arranged to move in a second direction, the second direction being perpendicular to the first direction.

3. The connector of claim 1, wherein the locking member further comprises a biasing member, an engaging member, and a fastener, the fastener operatively connecting the biasing member and the engaging member to the locking member, the biasing member biasing the engaging member in the engaging position, the engaging member including the flanged portion.

4. The connector of claim 1, wherein the base includes a bar portion configured and arranged to be operatively connected to a safety harness and the gate is configured and arranged to be operatively connected to a safety device proximate the first opening.

5. The connector of claim 1, wherein the locking member comprises a first locking member and a second locking member, the first locking member being proximate the first end and the second locking member being proximate the second end, and wherein both the first locking member and the second locking member are positioned in the releasing positions to move the gate relative to the base.

6. The connector of claim 1, further comprising a first receiving portion having a first receiving portion bore in the first end, a second receiving portion having a second receiving portion bore in the second end, a first extension portion including a first ring portion with a first aperture, and a second extension portion including a second ring portion with a second aperture, the first and second apertures being aligned with the first and second receiving portion bores.

7. The connector of claim 6, wherein a second opening is formed by the first extension portion and the second extension portion, a third opening is formed by the first receiving portion and the first extension portion, and a fourth opening is formed by the second extension portion and the second receiving portion.

8. The connector of claim 7, wherein the first receiving portion and the second receiving portion are integral with the base.

9. The connector of claim 1, further comprising a slot extending longitudinally along a portion of the gate and a pin operatively connected to the second end of the base extending into the slot.

10. The connector of claim 1, further comprising a notch proximate a distal end of the gate and a ramp portion interconnecting the notch and an engaging portion on the shaft, the notch and the ramp portion assisting in sliding the distal end of the shaft past the locking member when the gate is moved from the open position to the closed position.

11. The connector of claim 10, wherein the ramped portion is at least partially positioned on a distal face of the gate.

12. The connector of claim 1, further comprising a biasing member positioned at least partially within a cavity of the flanged portion.

13. The connector of claim 1, wherein the base includes a bar portion interconnecting a first end and a second end; the base forming a first receiving portion connected to the first end and a second receiving portion connected to the second end; wherein the locking member is positioned at one of an intersection of the first end and the first receiving portion and an intersection of the second end and the second receiving portion.

* * * * *